United States Patent
Zhang et al.

(10) Patent No.: US 12,483,894 B2
(45) Date of Patent: Nov. 25, 2025

(54) DUAL PROTOCOL FOR MOBILITY ENHANCEMENT

(71) Applicant: MEDIATEK Singapore Pte. Ltd, Singapore (SG)

(72) Inventors: Yuanyuan Zhang, Beijing (CN); Pavan Santhana Krishna Nuggehalli, San Jose, CA (US)

(73) Assignee: MEDIATEK Singapore Pte. Ltd, Singapore (SG)

( * ) Notice: Subject to any disclaimer, the term of this patent is extended or adjusted under 35 U.S.C. 154(b) by 565 days.

(21) Appl. No.: 17/377,287

(22) Filed: Jul. 15, 2021

(65) Prior Publication Data

US 2021/0345212 A1 Nov. 4, 2021

Related U.S. Application Data

(63) Continuation of application No. PCT/CN2020/073139, filed on Jan. 20, 2020.

(51) Int. Cl.
*H04W 36/18* (2009.01)
*H04W 12/033* (2021.01)
(Continued)

(52) U.S. Cl.
CPC ....... *H04W 12/106* (2021.01); *H04W 12/033* (2021.01); *H04W 36/0033* (2013.01);
(Continued)

(58) Field of Classification Search
CPC . H04W 12/033; H04W 12/106; H04W 28/06; H04W 36/0033; H04W 36/0069; H04W 36/18; H04W 36/36
See application file for complete search history.

(56) References Cited

U.S. PATENT DOCUMENTS 10,200,890 B2  2/2019  Khoryaev ............... H04L 5/00
2016/0044540 A1 2/2016  He ........................ H04W 76/02
(Continued)

FOREIGN PATENT DOCUMENTS

CN   104105221   10/2014
CN   105493554    4/2016
(Continued)

OTHER PUBLICATIONS

China National Intellectual Property Administration (CNIPA) Office Action for CN/20208001157.x dated Jan. 19, 2022 (16 pages).
(Continued)

*Primary Examiner* — Kashif Siddiqui
(74) *Attorney, Agent, or Firm* — Helen Mao; Imperium Patent Works

(57) ABSTRACT

Apparatus and methods are provided for mobility interruption reduction. In novel aspect, dual-protocol stack handover is performed with zero or close to zero mobility interruption. In one embodiment, the UE receives PDCP SDU from upper layers for UL transmission and is configured with a protocol stack associated with a source gNB and a target gNB for handover. The UE associates a COUNT value corresponding to TX_NEXT to the PDCP SDU, selects an UL gNB as a destination gNB for UL transmission, performs header compression with a robust header compression (ROHC) profile based on the UL gNB. In one embodiment, the UE selects the UL gNB when an UL grant is received from the selected gNB. In another embodiment, corresponding ROHC profiles are configured by the wireless network. In one embodiment, the ROHC profile for the UL gNB is configured by the selected UL gNB.

22 Claims, 15 Drawing Sheets

(51) Int. Cl.
*H04W 12/106* (2021.01)
*H04W 28/06* (2009.01)
*H04W 36/00* (2009.01)
*H04W 36/36* (2009.01)

(52) U.S. Cl.
CPC ......... *H04W 36/185* (2023.05); *H04W 36/36* (2013.01); *H04W 28/06* (2013.01)

(56) References Cited

U.S. PATENT DOCUMENTS

| | | | |
|---|---|---|---|
| 2016/0315868 | A1 | 10/2016 | Zhang ........................ H04L 1/18 |
| 2018/0083688 | A1* | 3/2018 | Agiwal ................. H04M 3/537 |
| 2019/0090156 | A1* | 3/2019 | Kim ........................ H04L 69/04 |
| 2020/0022035 | A1* | 1/2020 | Kadiri ............... H04W 36/0072 |
| 2020/0100142 | A1* | 3/2020 | Kim ..................... H04W 76/27 |
| 2020/0120548 | A1 | 4/2020 | Jin ........................ H04W 36/00 |
| 2021/0084546 | A1* | 3/2021 | Awoniyi-Oteri ............................ H04W 36/0061 |
| 2021/0105675 | A1* | 4/2021 | Kim ..................... H04W 80/08 |
| 2021/0345205 | A1* | 11/2021 | Persson ............. H04W 74/0833 |

FOREIGN PATENT DOCUMENTS

| | | |
|---|---|---|
| CN | 106063324 A | 10/2016 |
| CN | 105493554 A | 2/2018 |
| CN | 108810984 A | 11/2018 |
| CN | 109151940 A | 1/2019 |

OTHER PUBLICATIONS

R2-1802473, 3GPP TSG-RAN; WG2 #101; "DC based NR scheme for 0ms interruption handover" Huawei, HiSilicon (7 pages).
R2-1803662, 3GPP TSG-RAN WG2 #101, "NR 0ms Interruption HO", Qualcomm Incorporated (8 pages).
International Search Report and Written Opinion of International Search Authority for PCT/CN2020/073139 dated Apr. 20, 2020 (10 pages).
Taiwan Intellectual Property Office, Office Action, Dec. 9, 2020, (14 pages).
3GPP 3$^{rd}$ Generation Partnership Project; Technical specification Group Radio Access Network; Evolved Universal Terrestrial Radio Access (E-UTRA) ; Packet Data Convergence Protocol (PDCP) specification (Release 8) 3GPP TS 36.323 V8.6.0 Jun. 18, 2009 (Jun. 18, 2009) Sections 5.1.1,5.5.1 (p. 10, 11, 15-17).

* cited by examiner

DUAL PROTOCOL FOR MOBILITY ENHANCEMENT

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2020/073139, with an international filing date of Jan. 20, 2020, which in turn claims priority from PCT application PCT/CN2019/073178, titled "APPARATUS AND METHODS TO SUPPORT DUAL-PROTOCOL FOR MOBILITY ENHANCEMENT," with an international filing date of Jan. 25, 2019. This application is a continuation of International Application No. PCT/CN2020/073139, which claims priority from PCT Application No. PCT/CN2019/073178. International Application No. PCT/CN2020/073139 is pending as of the filing date of this application, and the United States is a designated state in International Application No. PCT/CN2020/073139. This application claims priority under 35 U.S.C. § 120 and § 365(c) from PCT Application Number PCT/CN2019/073178 filed on Jan. 25, 2019. The disclosure of each of the foregoing documents is incorporated herein by reference.

TECHNICAL FIELD

The disclosed embodiments relate generally to wireless communication, and, more particularly, to dual-stack protocol enhancement.

BACKGROUND 5G radio access technology will be a key component of the modern access network. It will address high traffic growth and increasing demand for high-bandwidth connectivity. It will also support massive numbers of connected devices and meet the real-time, high-reliability communication needs of mission-critical applications. Both the stand-alone NR deployment and non-standalone NR with LTE/eLTE deployment will be considered. In order to improve the UE experience quality, it's desirable to reduce the mobility interruption time during handover. Mobility interruption time means the shortest time duration supported by the system during which a user terminal cannot exchange user plane packets with any base station during transitions. The target for mobility interruption time should be 0ms, which is intended for both intra-frequency and inter-frequency mobility for intra-NR mobility.

In the current LTE system, the latency during handover execution is nearly 50 m seconds, which cannot satisfy the mobility interruption requirement in the NR system. Though solutions, such as RACH-less handover and make-before-break procedures, are proposed to reduce the mobility interruption, they cannot meet the latency requirements.

Improvements and enhancements are required to reduce mobility interruption with dual stack protocol.

SUMMARY

Apparatus and methods are provided for mobility interruption reduction. In novel aspect, dual-protocol stack handover is performed with zero or close to zero mobility interruption for both the LTE network and the NR network. In one embodiment, the UE receives PDCP SDU from upper layers for UL transmission and is configured with a protocol stack of the UE has protocols associated with a source gNB and a target gNB for handover. The UE associates a COUNT value corresponding to TX_NEXT to the PDCP SDU, selects an gNB as a destination gNB for UL transmission, performs header compression with a robust header compression (ROHC) profile based on the selected gNB and integrity protection and ciphering by a UE protocol stack entity associated with the selected gNB using a security key and configuration for the selected gNB, and submits a resulting PDCP data protocol data unit (PDU) to lower layers of the UE protocol stack associated with the selected gNB. In one embodiment, the UE selects the gNB when an UL grant is received from the gNB. In another embodiment, corresponding ROHC profiles are configured for the source gNB and the target gNB by the wireless network. In one embodiment, the ROHC profile for the gNB is configured by the gNB itself. In one embodiment, the UE reconfigures the PDCP of the UE protocol stack and releases RLC, MAC, and PHY layers of the UE protocol stack associated with the source gNB upon transmitting a Reconfiguration Complete message to the target gNB. In one embodiment, the UE receives PDCP PDU from lower layers for downlink (DL) packet transmission in a wireless network, wherein a protocol stack of the UE has one PDCP entity associated with a source gNB and a target gNB for handover. The UE determines a COUNT value of the received PDCP PDU by a PDCP receiving entity associated with a gNB from which the PDCP PDU is received, performs PDCP reordering for a PDCP service data unit (SDU) when stored in a reception buffer and header decompression of the PDCP SDU based on robust header compression (ROHC) profile, and delivers the PDCP SDU to upper layers of the UE protocol stack in ascending order of the COUNT value.

In one embodiment, there is one common reception buffer at PDCP layer, which stores the PDCP SDUs. There is one common function for PDCP reordering and duplication detection. There is one common function for header compression/decompression. Those common functions are associated to the two PDCP entities. In another embodiment, certain functions in the PDCP entity for source gNB or the target gNB are disabled. In one embodiment, the PDCP reordering function is disabled. In another embodiment, the header compression/decompression is disable. So the PDCP SDU with SN and header are forwarded from one PDCP entity to the other for process. In yet another embodiment, the criteria to release the protocol associated to the source gNB are defined.

This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
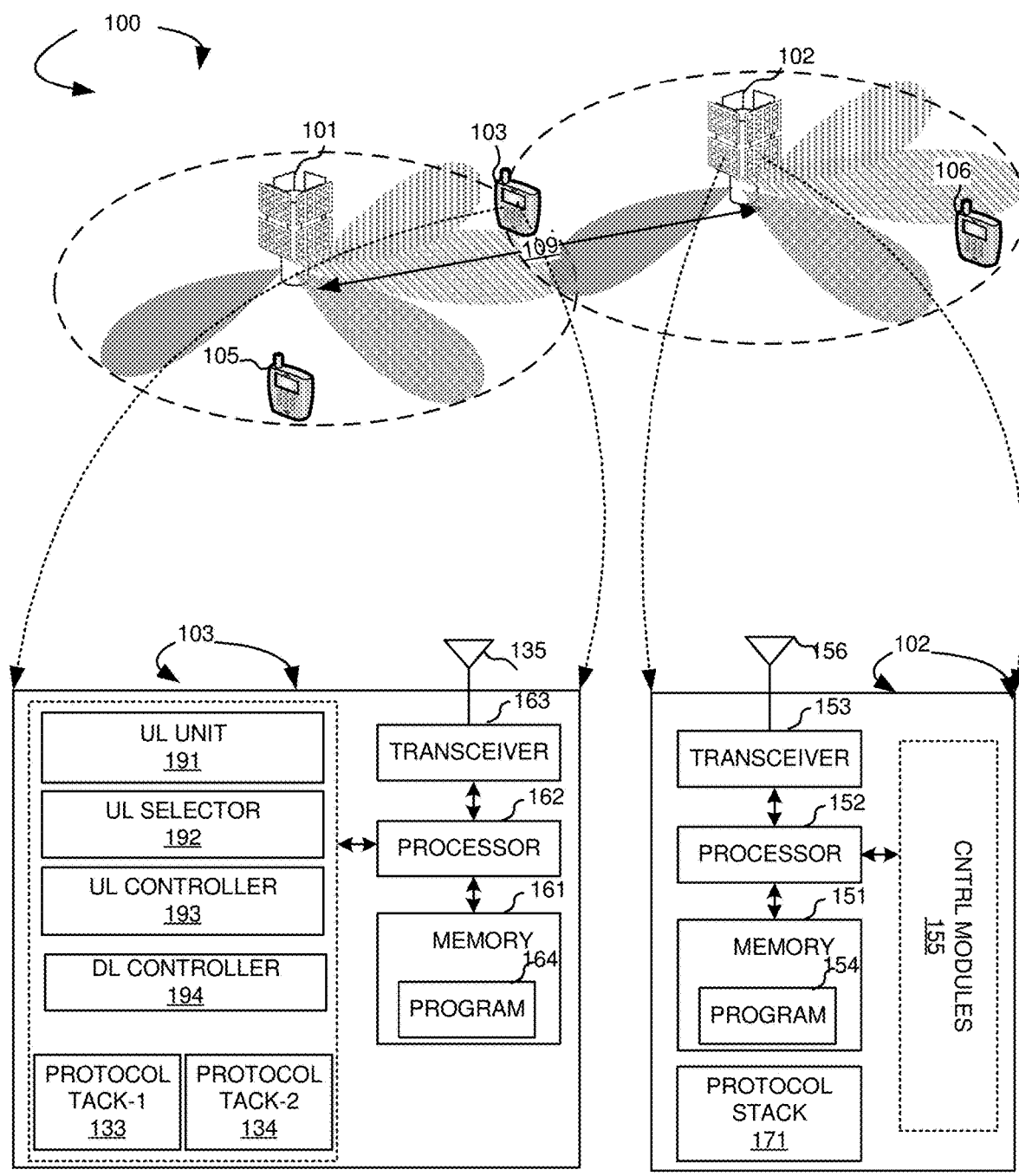
FIG. 1 is a schematic system diagram illustrating an exemplary wireless network for mobility interruption reduction with dual-stack in accordance with embodiments of the current invention.

FIG. 1 is a schematic system diagram illustrating an exemplary wireless network 100 for mobility interruption reduction with dual-stack in accordance with embodiments of the current invention. Wireless system 100 includes one or more fixed base infrastructure units forming a network distributed over a geographical region. The base unit may also be referred to as an access point, an access terminal, a base station, a Node-B, an eNode-B, a gNB, or by other terminology used in the art. The network can be homogeneous network or heterogeneous network, which can be deployed with the same frequency or different frequency. gNB 101 and gNB 102 are base stations in the NR network, the serving area of which may or may not overlap with each other. As an example, user equipment (UE) 105 or mobile station 105 is only in the service area of gNB 101 and connected with gNB 101. UE 105 is connected with gNB 101 only. Similarly, UE 106 is only in the service area of gNB 102 and connected with gNB 102. UE 106 is connected with gNB 102 only. gNB 101 is connected with gNB 102 via Xnr interface 109. UE 103 is in the overlapping service area of gNB 101 and gNB 102. In one embodiment, UE 103 is configured with dual protocol stacks and can be connected with gNB 101 and gNB 102 simultaneously.

FIG. 1 further shows simplified block diagrams of gNB 102 and mobile station/UE 103 in accordance with the current invention. gNB 102 has an antenna 156, which transmits and receives radio signals. An RF transceiver circuit 153, coupled with the antenna, receives RF signals from antenna 156, converts them to baseband signals, and sends them to processor 152. RF transceiver 153 also converts received baseband signals from processor 152, converts them to RF signals, and sends out to antenna 156. Processor 152 processes the received baseband signals and invokes different functional modules to perform features in gNB 102. Memory 151 stores program instructions and data 154 to control the operations of gNB 102. gNB 102 has a protocol stack 171. gNB 102 also includes a set of control modules 155 that carry out functional tasks to communicate with mobile stations.

UE 103 has an antenna 135, which transmits and receives radio signals. An RF transceiver circuit 163, coupled with the antenna, receives RF signals from antenna 135, converts them to baseband signals, and sends them to processor 162. In one embodiment, the RF transceiver may comprise two RF modules (not shown). A first RF module is used for HF transmitting and receiving, and the other RF module is used for different frequency bands transmitting and receiving which is different from the HF transceiver. RF transceiver 163 also converts received baseband signals from processor 162, converts them to RF signals, and sends out to antenna 135. Processor 162 processes the received baseband signals and invokes different functional modules to perform features in UE 103. Memory 161 stores program instructions and data 164 to control the operations of UE 103. Antenna 135 sends uplink transmission and receives downlink transmissions to/from antenna 156 of gNB 102.

Mobile station 103 also includes a set of control modules that carry out functional tasks. An UL unit 191 receives a packet data convergence protocol (PDCP) service data unit (SDU) from upper layers for uplink (UL) packet transmission, wherein a protocol stack of the UE has protocols associated with a source gNB and a target gNB for handover (HO) and associates a COUNT value corresponding to TX_NEXT to the PDCP SDU. An UL selector 192 selects an gNB as a destination gNB for UL transmission. An UL controller 193 performs header compression with a robust header compression (ROHC) profile based on the selected gNB, performs integrity protection and ciphering a UE protocol stack entity associated with the gNB using a security key and configuration for the gNB, and submits a resulting PDCP data packet data unit (PDU) to lower layers of the UE protocol stack associated with the gNB. A DL controller 194 receives a PDCP PDU from lower layers for DL packet transmission, determines a COUNT value of the received PDCP PDU by a PDCP receiving entity; performs PDCP reordering for a PDCP service data unit (SDU) when stored in a reception buffer; performs header decompression of the PDCP SDU based on ROHC profile based on the configuration of the gNB from which the PDCP PDU is received; and delivers the PDCP SDU to upper layers of the UE protocol stack in ascending order of the COUNT value. UL controller 193 and DL controller 194 may perform other functions for UL and DL, respectively. These functions include to add or remove the protocol stack associated to source gNB and target gNB, to associate the different security keys to different gNBs, to determines to use one or more ROHC profiles according to network configuration for different base station and apply the ROHC profile in the corresponding Protocol stack. Protocol stacks 133 and 134 each further includes RLC, MAC and PHY layers. In one embodiment, the SDAP layer is optionally configured.

In one embodiment, the PDCP layer supports the functions of transfer of data, maintenance of PDCP SN, header compression and decompression using the ROHC protocol, ciphering and deciphering, integrity protection and integrity verification, timer based SDU discard, routing for split bearer, duplication, re-ordering and in-order delivery; out of order delivery and duplication discarding.

In one embodiment, there is one additional PDCP reordering and duplication detection function, which receives the PDCP PDUs from both target gNB and source gNB, reorders those PDCP PDUs based on the SN/COUNT and delivers the PDCP SDUs to upper layer in-sequence order. In one embodiment, the PDCP reordering and duplication detection is also performed by PDCP layer.

Figure 2:
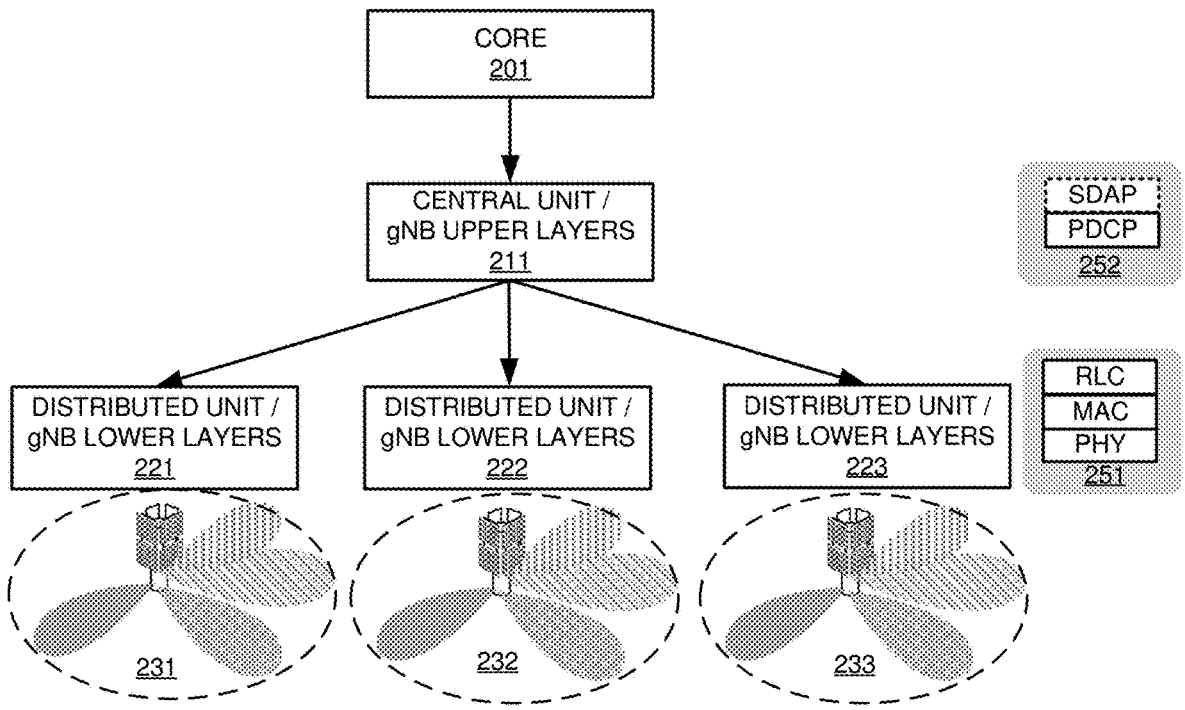
FIG. 2 illustrates an exemplary flow chart of the interruption-optimized/dual-stack handover procedure in accordance with embodiments of the current invention.

FIG. 2 illustrates an exemplary NR wireless system with centralized upper layers of the NR radio interface stacks in accordance with embodiments of the current invention. Different protocol split options between central unit and lower layers of gNB nodes may be possible. The functional split between the central unit and lower layers of gNB nodes may depend on the transport layer. Low performance transport between the Central Unit and lower layers of gNB nodes can enable the higher protocol layers of the NR radio stacks to be supported in the Central Unit, since the higher protocol layers have lower performance requirements on the transport layer in terms of bandwidth, delay, synchronization and jitter. In one embodiment, SDAP and PDCP layer are located in the central unit, while RLC, MAC and PHY layers are located in the distributed unit. A Core unit 201 is connected with one central unit 211 with gNB upper layer 252. In one embodiment, gNB upper layer 252 includes the PDCP layer and optionally the SDAP layer. Central unit 211 is connected with distributed units 211, 212, and 213. Distributed units 221, 222, and 223 each corresponds to a cell 231, 232, and 233, respectively. The distributed units, such as 221, 222 and 223 includes gNB lower layers 251. In one embodiment, gNB lower layers 251 include the PHY, MAC and the RLC layers.

Figure 3:
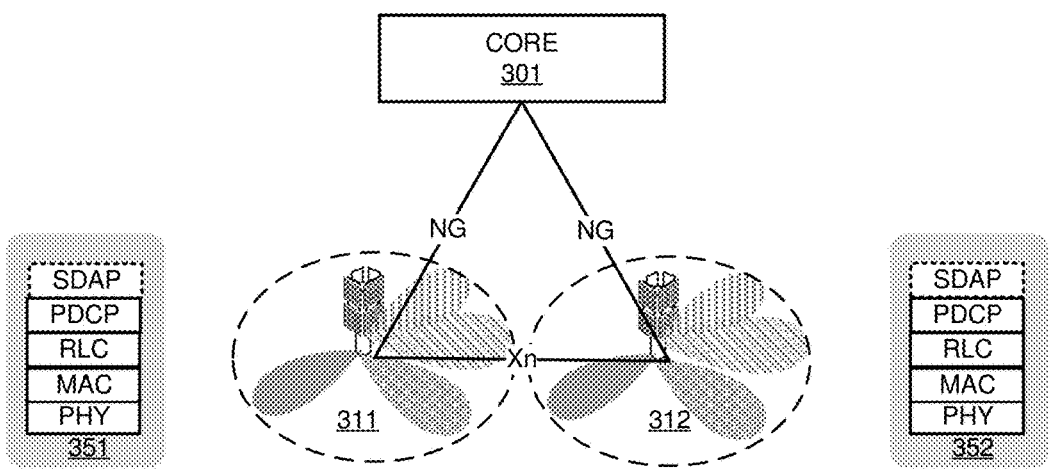
FIG. 3 illustrates exemplary block diagrams of the user plane architecture at the network side when interruption-optimized/dual-stack HO is performed in accordance with embodiments of the current invention.

FIG. 3 illustrates an exemplary NR wireless system supporting inter gNB mobility scenario in accordance with embodiments of the current invention. The intra 5G intra-RAT handover is normally based on Xn-based handover. HO is performed between gNBs through Xn interface, which are connected to the NR core network. Each gNB has the protocol stacks including SDAP, PDCP, RLC, MAC and PHY layers. A gNB 311 and a gNB 312 are both 5G gNBs with a protocol stack 351 and 352, respectively. gNB 311 and gNB 312 connects with the Core 301 via NG connection. gNB 311 and gNB 312 connect with each other via Xn interface. Protocol stacks 351 and 352 includes PHY, MAC, RLC, PDCP and optionally SDAP.

Figure 4A:
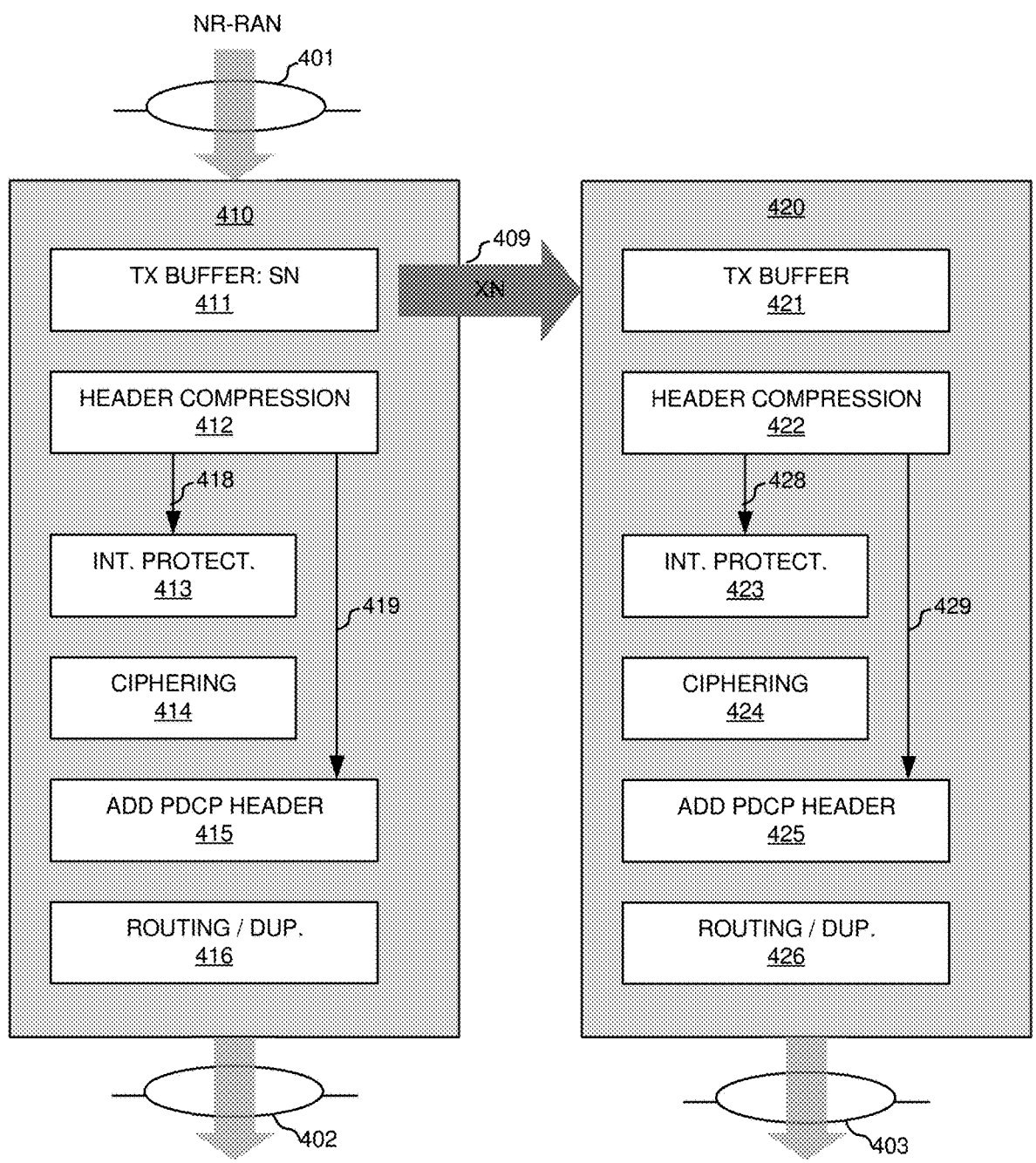
FIG. 4A illustrates an exemplary user-plane data transmission in PDCP layer with inter-gNB mobility with separate TX buffers before header compression for the DL in accordance with embodiments of the current invention.

FIG. 4A illustrates an exemplary user-plane data transmission in PDCP layer with inter-gNB mobility with separate TX buffers before header compression for the DL transmission in accordance with embodiments of the current invention. The DL transmission 401 is handled by source 410 and target 420. In one embodiment of DL packets transmission, for a PDCP SDU received from upper layers, the transmitting PDCP entity 410 at the source gNB shall associate the COUNT value corresponding to TX_NEXT to this PDCP SDU. The source transmission buffer 411 sets the PDCP SN of the PDCP Data PDU to TX_NEXT modulo $2^{[pdcp\text{-}SN\text{-}Size]}$ and determines through which gNB to transmit the PDCP SDU. If the PDCP SDU is to be transmitted through the source gNB, source 410 at step 412, performs header compression of the PDCP SDU based on the ROHC profile of the source gNB, at step 413, performs integrity protection, and at step 414 performs ciphering using the security key and configuration of the source gNB. At step 415, the PDCP header is added and at step 416, routing/duplication are performed, and passes to source DL 402. If the PDCP SDU is to be transmitted through the target gNB, at step 409, the source gNB forwards the PDCP SDU and the associated SN to the target gNB. In one embodiment, the forwarded packets are sent to the target transmission buffer 421. At step 422, the target gNB performs header compression of the PDCP SDU based on the ROHC profile of the target gNB, at step 423, performs integrity protection, and at step 424, performs ciphering using the security key and configuration of the target gNB. At step 425, the PDCP header is added and at step 426, routing/duplication are performed, and passes to target DL 403. Based on predefined rules/configurations, some PDCP packets are ciphered before compression and some PDCP packets are not ciphered. In one embodiment, when compressed packets each associated with one PDCP SDU, ciphering is performed via 418 and 428 for source and target, respectively. When compressed packets are standalone packets not associated with a PDCP SDU, such as interspersed ROHC feedback, ciphering is not performed via 419 and 429 for source target, respectively. Then the resulting PDCP Data PDU are submitted to lower layer.

Figure 4B:
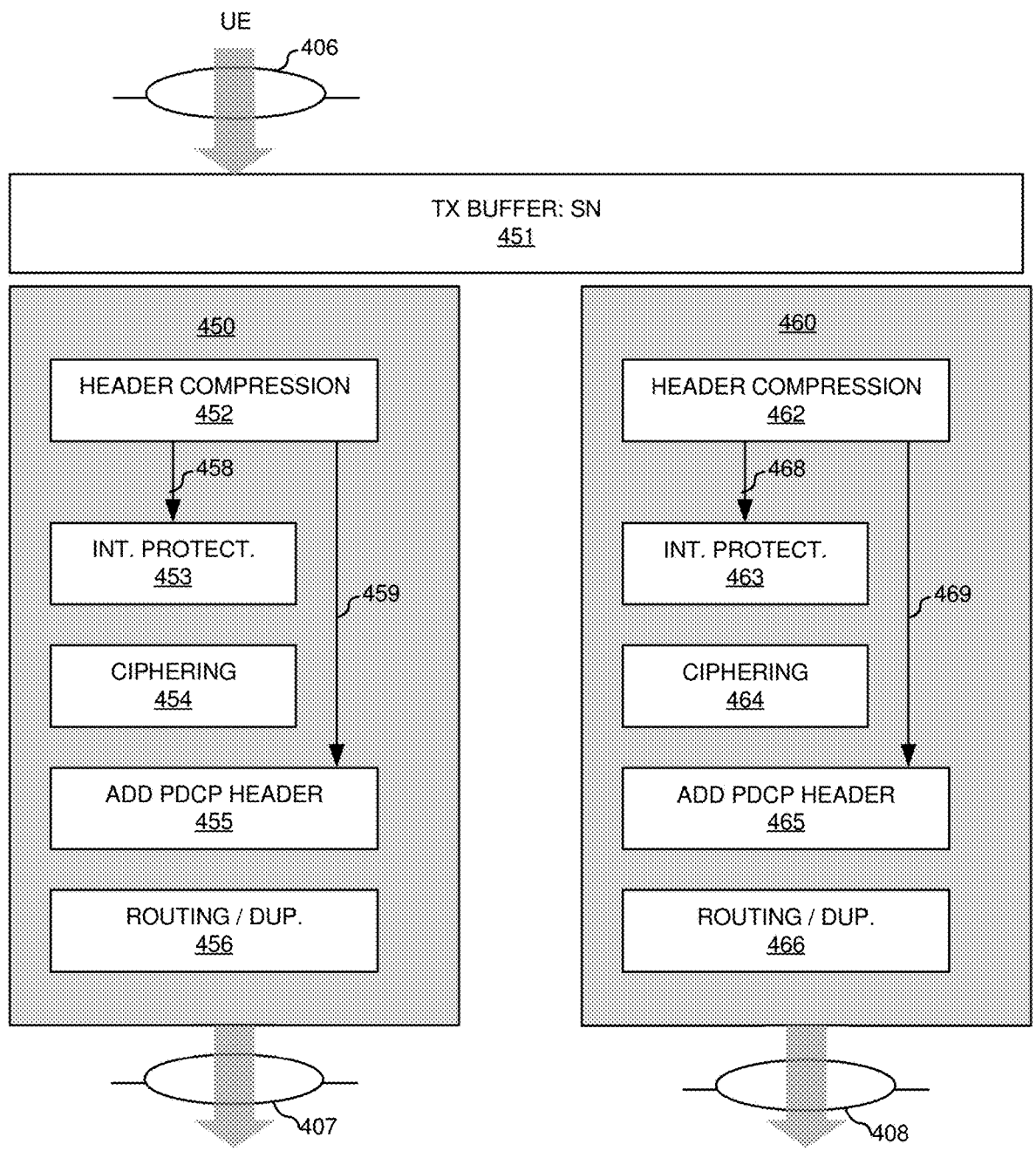
FIG. 4B illustrates an exemplary user-plane data transmission in PDCP layer with inter-gNB mobility with one TX buffer before header compression for the UL in accordance with embodiments of the current invention

FIG. 4B illustrates an exemplary user-plane data transmission in PDCP layer with inter-gNB mobility for the UL transmission in accordance with embodiments of the current invention. The UL transmission is handled by UE 406. In one embodiment of UL packets transmission, at step 451, for a PDCP SDU received from upper layers, the transmitting PDCP entity shall associate the COUNT value corresponding to TX_NEXT to this PDCP SDU and set the PDCP SN of the PDCP Data PDU to TX_NEXT modulo $2^{[pdcp\text{-}SN\text{-}Size]}$. The UE determines/selects to which gNB to transmit the PDCP SDU. In one embodiment, the PDCP SDU is transmitted to the base station from which UL grant is received. The UE, thereby, selects the gNB, from which the UL grant is received for the UL transmission. If the PDCP SDU is to be transmitted to the source gNB, at step 452, the UE performs header compression of the PDCP SDU with ROHC profile of the source gNB, at step 453, performs integrity protection, and at step 454, performs ciphering using the security key and configuration of the source gNB. At step 455, the PDCP header is added and at step 456, routing are performed, and passes to source UL 407. If the PDCP SDU is to be transmitted to the target gNB, at step 462, the UE performs header compression of the PDCP SDU with ROHC profile of the target gNB, at step 463, performs integrity protection, and at step 464, performs ciphering using the security key and configuration of the target gNB. Then the resulting PDCP Data PDU are submitted to lower layer associated to the target base station. At step 465, the PDCP header is added and at step 466, routing is performed, and passes to target UL 408. When compressed packets each associated with one PDCP SDU, ciphering is performed via 458 and 468 for source and target, respectively. Based on predefined rules/configurations, some PDCP packets are ciphered before compression and some PDCP packets are not ciphered. In one embodiment, when compressed packets are standalone packets not associated with a PDCP SDU, such as interspersed ROHC feedback, ciphering is not performed via 459 and 469 for source target, respectively.

Figure 5A:
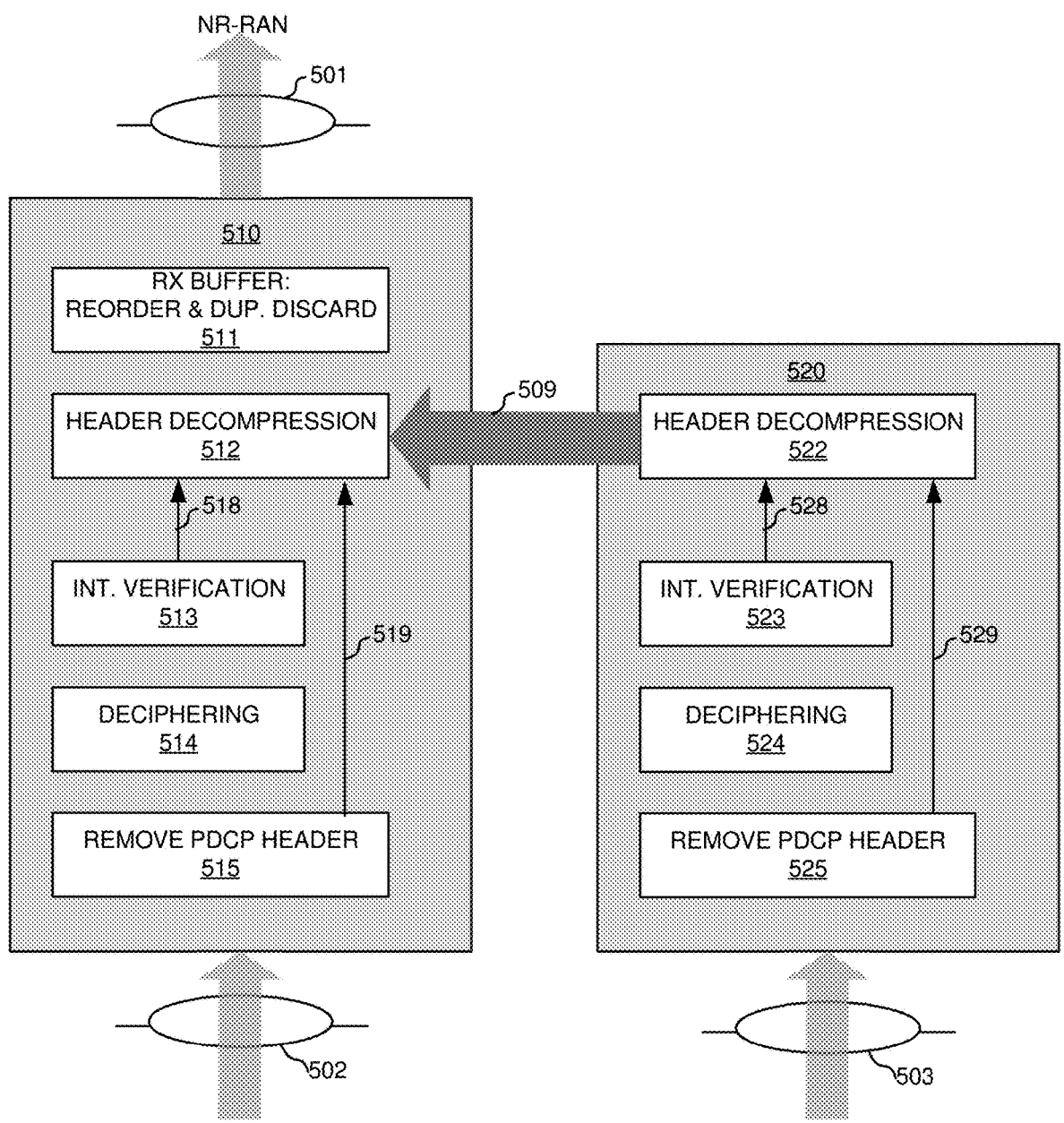
FIG. 5A illustrates an exemplary user-plane data reception in PDCP layer with inter-gNB mobility with one TX buffer at the source entity before header compression for the DL in accordance with embodiments of the current invention.

FIG. 5A illustrates an exemplary user-plane data UL reception in PDCP layer with inter-gNB mobility with one RX buffer at the source gNB before header decompression for the UL in accordance with embodiments of the current invention. The UL reception 501 is handled by the source 510 and target 520. In one embodiment of UL packets reception, including source UL 502 and target UL 503, both the source gNB and the target gNB have the receiving PDCP entity. At reception of a PDCP Data PDU from lower layers, each receiving PDCP entity shall determine the COUNT value of the received PDCP Data PDU, i.e. RCVD_COUNT. After determining the COUNT value of the received PDCP Data PDU=RCVD_COUNT, the receiving PDCP entity shall perform deciphering and integrity verification of the PDCP Data PDU using COUNT=RCVD_COUNT. If the receiving PDCP entity is associated to the source gNB, the source entity 510 at step 515 removes PDCP header, at step 514, performs deciphering and at step 513 integrity verification with the security key and configuration of the source gNB, and at step 512 performs header decompression based on the ROHC profile of source gNB. If the receiving PDCP entity is associated to the target gNB, target entity 520 at step 525 removes PDCP header, at step 524, performs deciphering and at step 523 performs integrity verification with the security key and configuration of the target gNB, and at step 522 performs header decompression based on the ROHC profile of target gNB. Then the receiving PDCP entity of the target gNB, at step 509, forwards the PDCP SDUs and SN to the source gNB. If the received PDCP Data PDU with COUNT value=RCVD COUNT is not discarded before, the receiving PDCP entity of the source gNB, at step 511, shall store the resulting PDCP SDU in the reception buffer. Then the source gNB perform PDCP reordering for the PDCP SDUs stored in the reception buffer according to the COUNT value. The PDCP SDUs are delivered to upper layers in ascending order of the associated COUNT value after performing header decompression. Based on predefined rules/configurations, some PDCP packets are ciphered before compression and some PDCP packets are not ciphered. In one embodiment, the PDCP data PDUs are deciphered before sending to decompression via 518 and 528 for source and target, respectively. The PDCP control PDUs, SDAP header and SDAP control PDU if included in the PDCP SDU are not deciphered via 519 and 529 for source and target, respectively.

Figure 5B:
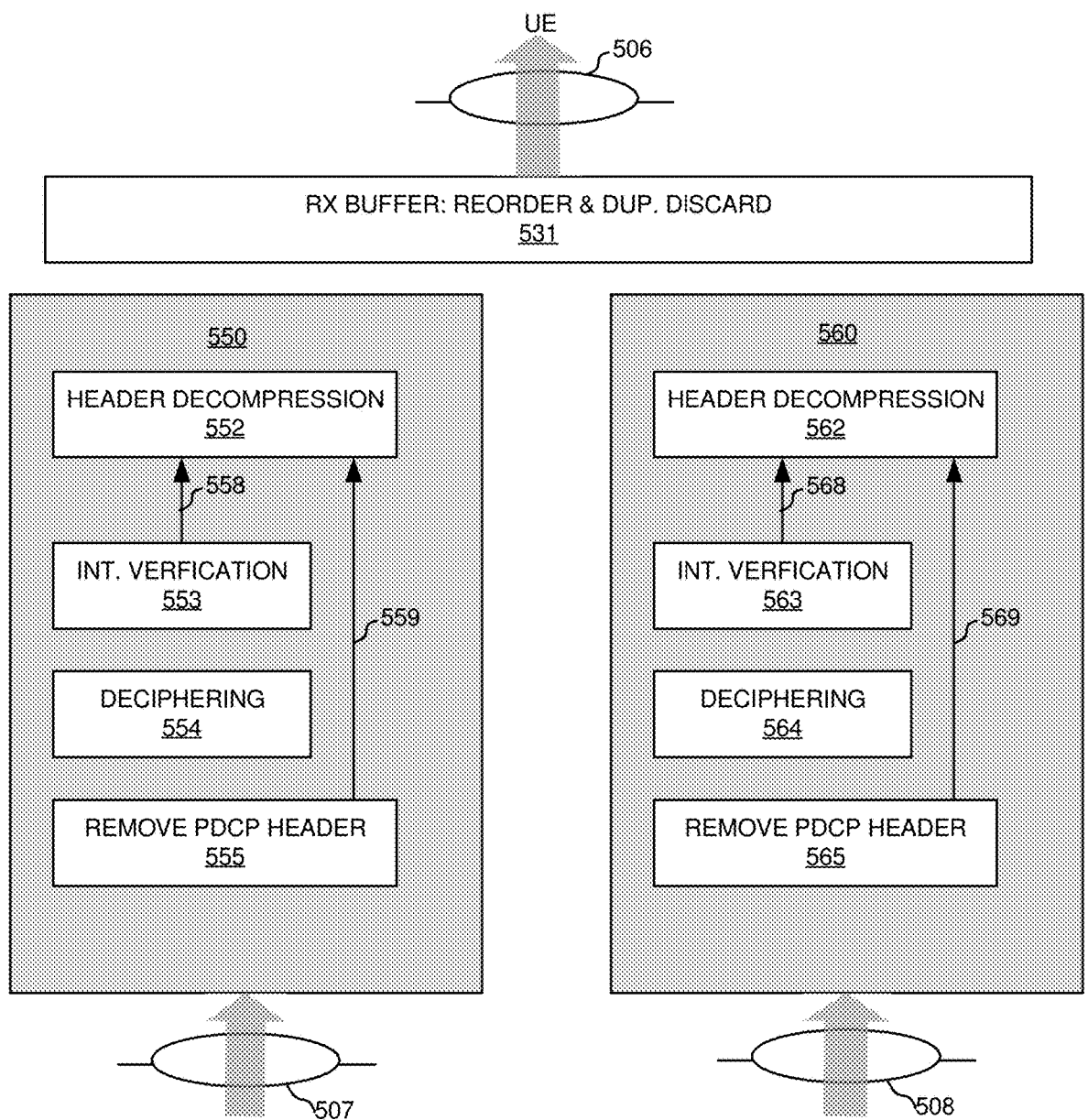
FIG. 5B illustrates an exemplary user-plane data reception in PDCP layer with inter-gNB mobility with one RX buffer at the source entity before header compression for the DL in accordance with embodiments of the current invention.

FIG. 5B illustrates an exemplary user-plane data reception in PDCP layer with inter-gNB mobility with one RX buffer after header decompression for the DL in accordance with embodiments of the current invention. DL reception is handled by UE 506. In one embodiment of DL packets reception, at reception of a PDCP Data PDU from lower layers, associated to source DL 507 or target DL 508, the receiving PDCP entity shall determine the COUNT value of the received PDCP Data PDU, i.e. RCVD_COUNT. After determining the COUNT value of the received PDCP Data PDU=RCVD_COUNT, the receiving PDCP entity 550 shall remove PDCP header, perform deciphering and perform integrity verification of the PDCP Data PDU using COUNT=RCVD_COUNT. If the PDCP PDU is received from the source gNB, at step 555, removes PDCP header, at step 554, performs deciphering and at step 553, performs integrity verification with the security key and configuration of the source gNB, and at step 552, performs header decompression of the PDCP SDU based on the ROHC profile of the source gNB. If the PDCP PDU is received from the target gNB, target entity 560, at step 565, performs deciphering and at step 564 performs integrity verification with the security key and configuration of the target gNB and at step 562, performs header decompression of the PDCP SDU based on the ROHC profile of the target gNB. If the received PDCP Data PDU with COUNT value=RCVD_COUNT is not discarded before, the receiving PDCP entity shall store the resulting PDCP SDU in the reception buffer at step 531. UE performs PDCP reordering for the PDCP SDUs stored in the reception buffer according to the COUNT value. The PDCP SDUs are delivered to upper layers in ascending order of the associated COUNT value. Based on predefined rules/configurations, some PDCP packets are deciphered before decompression and some PDCP packets are not deciphered. In one embodiment, the PDCP data PDUs are deciphered before sending to decompression via 558 and 5268 for source and target, respectively. The PDCP control PDUs, SDAP header and SDAP control PDU if included in the PDCP SDU are not deciphered via 559 and 569 for source and target, respectively.

Figure 6A:
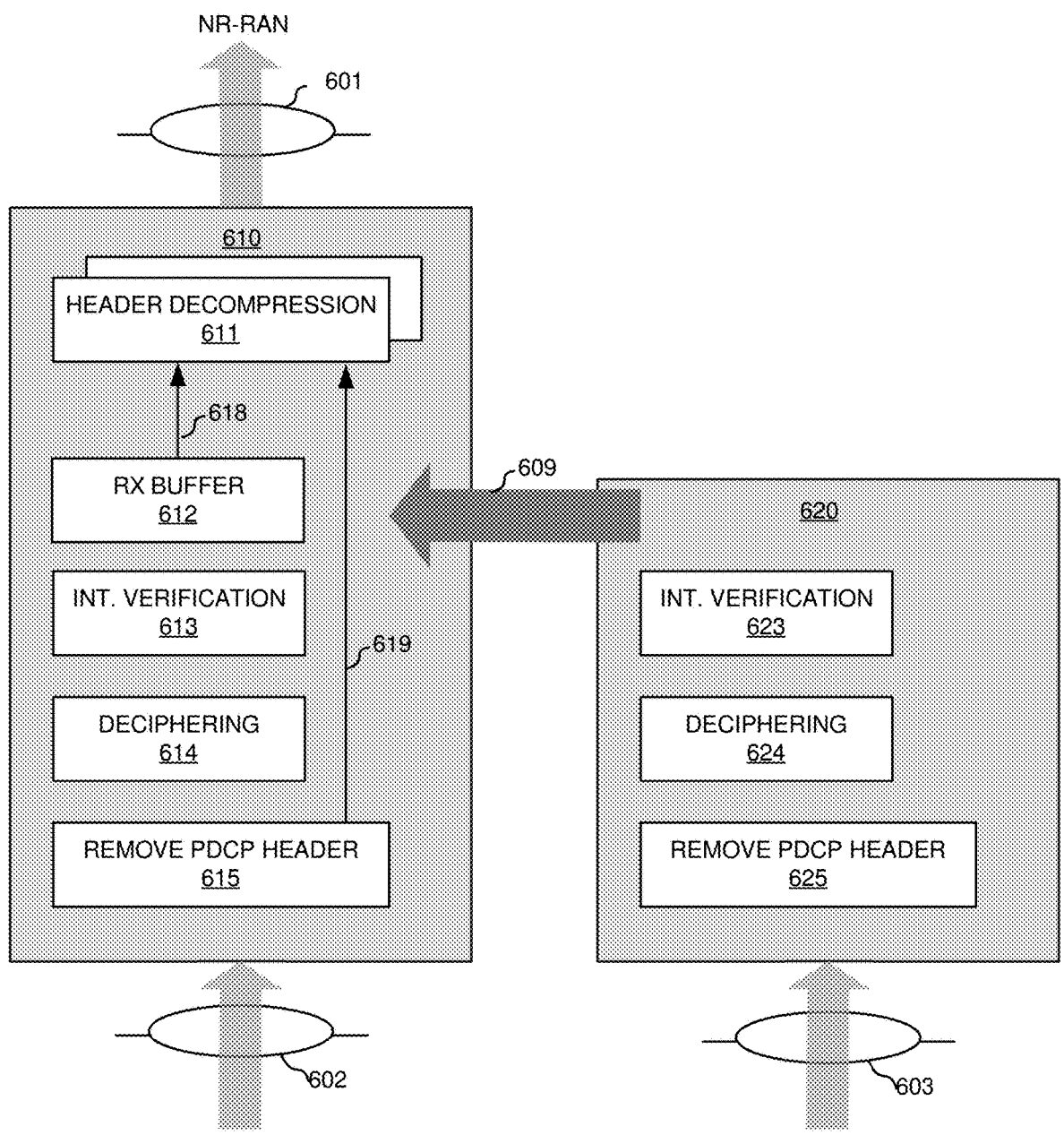
FIG. 6A illustrates an exemplary user-plane data reception in PDCP layer with inter-gNB mobility with multiple header compressors in source entity in accordance with embodiments of the current invention.

FIG. 6A illustrates an exemplary user-plane data UL reception in PDCP layer with inter-gNB mobility with multiple header decompressors in source gNB in accordance with embodiments of the current invention. In one embodiment of UL packets reception, both the source gNB and the target gNB have the receiving PDCP entity. UL transmission 601 is handled by source 610 and target 620. At reception of a PDCP Data PDU from lower layers, including source UL 602 and target UL 603, each receiving PDCP entity shall determine the COUNT value of the received PDCP Data PDU, i.e. RCVD_COUNT. After determining the COUNT value of the received PDCP Data PDU=RCVD_COUNT, the receiving PDCP entity shall perform deciphering and integrity verification of the PDCP Data PDU using COUNT=RCVD_COUNT. If the receiving PDCP entity is associated to the source gNB, source 610, at step 615 removes PDCP header, at step 614, performs deciphering and at step 613, performs integrity verification with the security key and configuration of the source gNB. If the receiving PDCP entity is associated to the target gNB, target entity 620 at step 625 removes PDCP header, at step 624, performs deciphering and at step 623, performs integrity verification with the security key and configuration of the target gNB. Then, at step 609, the receiving PDCP entity of the target gNB 620 forwards the PDCP SDUs, SN and header to the source gNB. If the received PDCP Data PDU with COUNT value=RCVD_COUNT is not discarded before, at step 612, the receiving PDCP entity of the source gNB 610 shall store the resulting PDCP SDU in the reception buffer. Then the source gNB perform PDCP reordering for the PDCP SDUs stored in the reception buffer according to the COUNT value. There are two header decompression modules at the source gNB. However, at step 611, one of the header decompression module performs header decompression for the PDCP SDUs forwarded from the target gNB with the ROHC profiles corresponding to the target gNB. The PDCP SDUs are delivered to upper layers in ascending order of the associated COUNT value. Based on predefined rules/configurations, some PDCP packets are deciphered before decompression and some PDCP packets are not deciphered. In one embodiment, the PDCP data PDUs are deciphered before sending to decompression via 618 and 628 for source and target, respectively. The PDCP control PDUs, SDAP header and SDAP control PDU if included in the PDCP SDU are not deciphered via 619 and 629 for source and target, respectively.

Figure 6B:
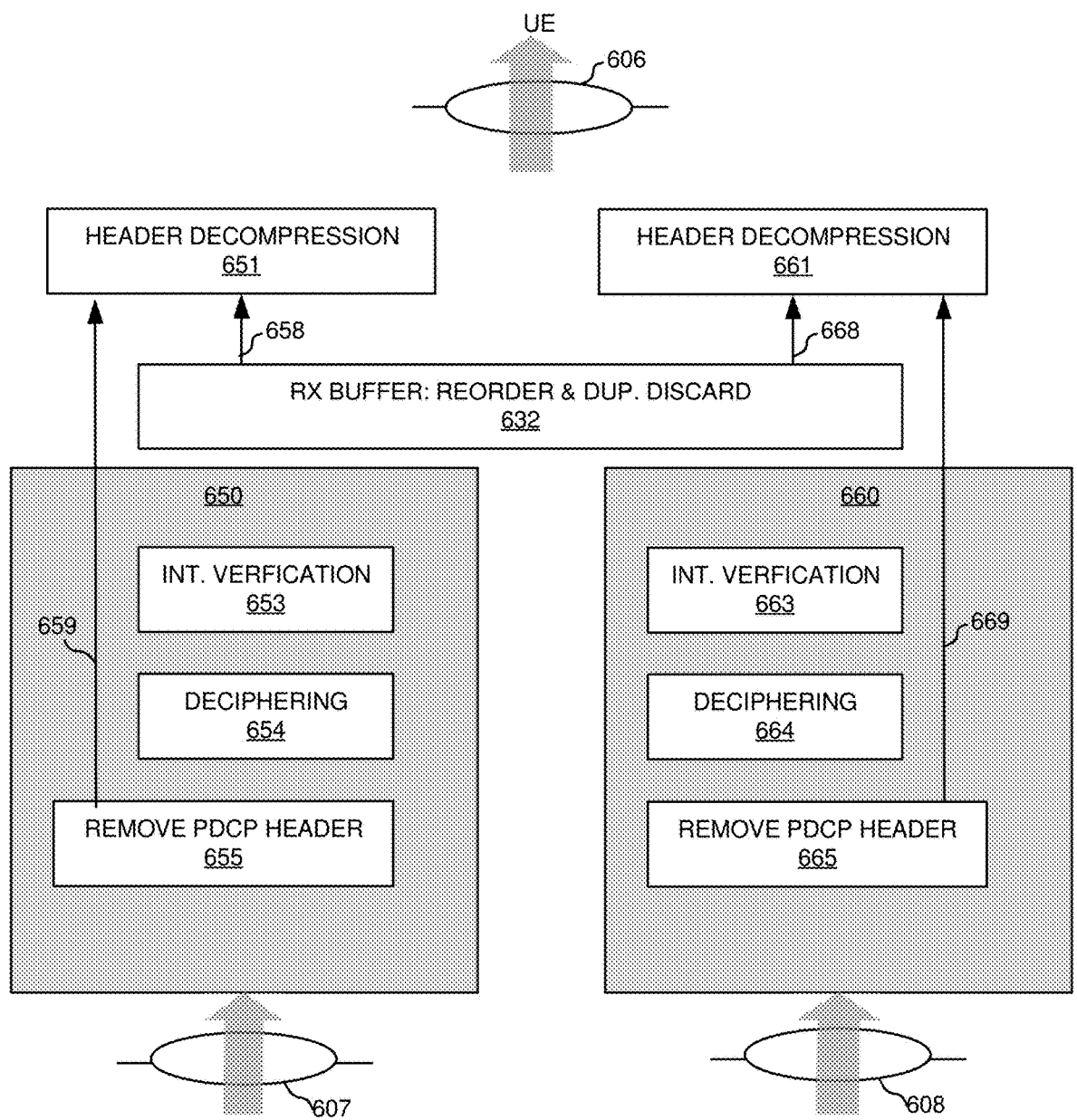
FIG. 6B illustrates an exemplary user-plane data reception in PDCP layer with inter-gNB mobility with separate header decompressors after the common RX buffer in accordance with embodiments of the current invention.

FIG. 6B illustrates an exemplary user-plane data DL reception in PDCP layer with inter-gNB mobility with separate header decompressors after the common RX buffer in accordance with embodiments of the current invention. DL reception 605 is handled by source 650 and target 660. In one embodiment of DL packets reception, at reception of a PDCP Data PDU from lower layers, the receiving PDCP entity shall determine the COUNT value of the received PDCP Data PDU, i.e. RCVD_COUNT. After determining the COUNT value of the received PDCP Data PDU=RCVD_COUNT, the receiving PDCP entity shall perform deciphering and integrity verification of the PDCP Data PDU using COUNT=RCVD_COUNT. If the PDCP PDU is received from the source gNB, source 650, at step 655 removes PDCP header, at step 654, performs deciphering and at step 653, performs integrity verification with the security key and configuration of the source gNB. If the PDCP PDU is received from the target gNB, target 660, at step 665, removes PDCP header, at step 664, performs deciphering and at step 663, performs integrity verification with the security key and configuration of the target gNB. If the received PDCP Data PDU with COUNT value=RCVD_COUNT is not discarded before, at step 632, the receiving PDCP entity shall store the resulting PDCP SDU in the reception buffer. UE perform PDCP reordering for the PDCP SDUs stored in the reception buffer according to the COUNT value. UE should route each PDCP SDU to the corresponding header decompression module. There are two header decompression modules 651 and 661 corresponding to the source gNB and the target gNB, respectively. For the header decompression module corresponding to source gNB/target gNB, UE perform header decompression of the PDCP SDU based on the ROHC profile of the source gNB/target gNB. The PDCP SDUs are delivered to upper layers in ascending order of the associated COUNT value after performing header decompression. Based on predefined rules/configurations, some PDCP packets are deciphered before decompression and some PDCP packets are not deciphered. In one embodiment, the PDCP data PDUs are deciphered before sending to decompression via 658 and 558 for source and target, respectively. The PDCP control PDUs, SDAP header and SDAP control PDU if included in the PDCP SDU are not deciphered via 659 and 669 for source and target, respectively.

Figure 7A:
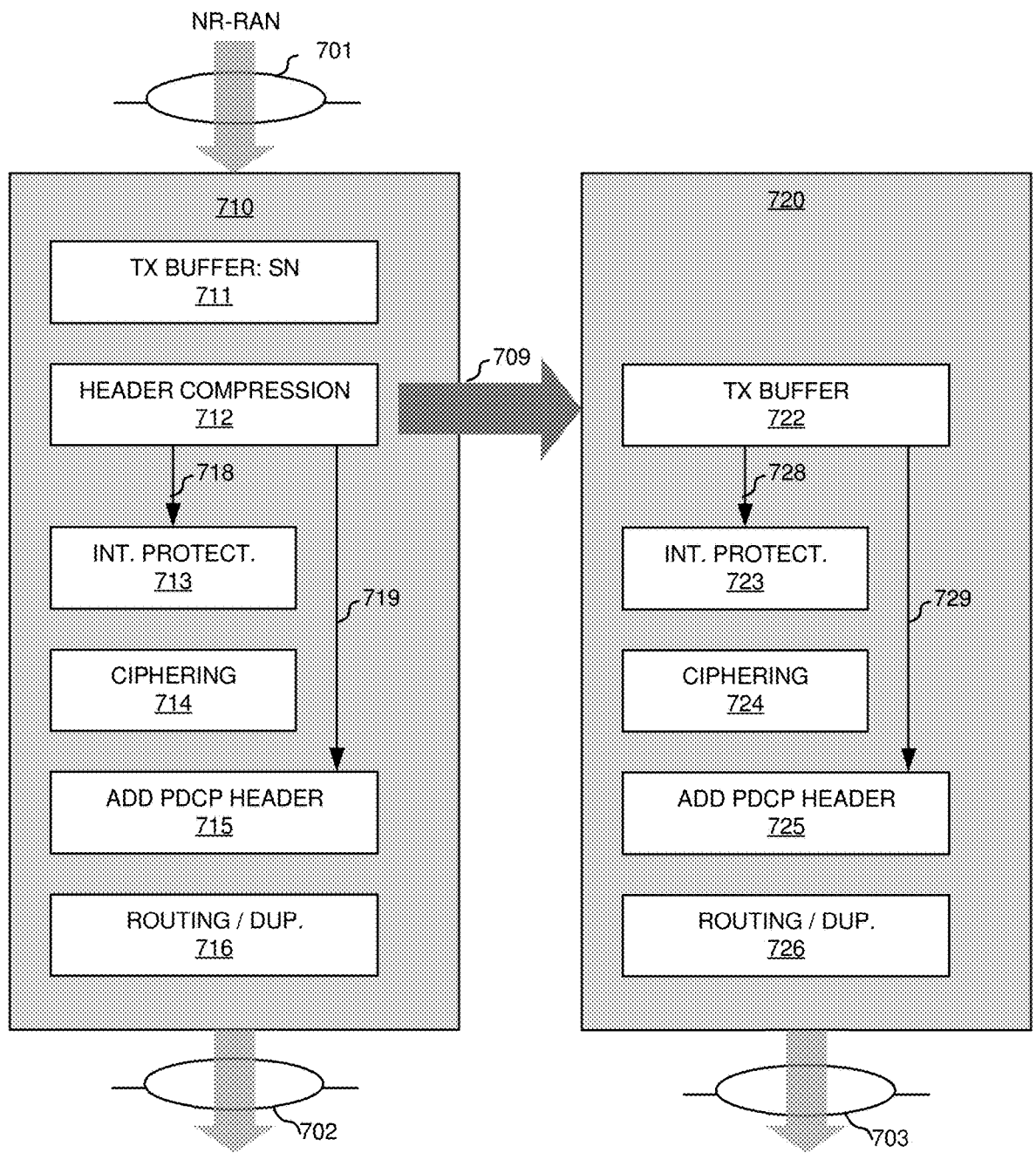
FIG. 7A illustrates an exemplary user-plane data transmission in PDCP layer with inter-gNB mobility with source compression for DL in accordance with embodiments of the current invention.

FIG. 7A illustrates an exemplary user-plane data transmission in PDCP layer with inter-gNB mobility with source compression for DL transmission in accordance with embodiments of the current invention. DL transmission 701 is handled by source 710 and target 720. In one embodiment of DL packets transmission, for a PDCP SDU received from upper layers, the transmitting PDCP entity at the source gNB shall associate the COUNT value corresponding to TX_NEXT to this PDCP SDU, perform header compression of the PDCP SDU. The source transmission buffer 711 sets the PDCP SN of the PDCP Data PDU to TX_NEXT modulo $2^{[pdcp-SN-Size]}$ and determines through which gNB to transmit the PDCP SDU. If the PDCP SDU is to be transmitted through the source gNB, source 710 at step 712, performs header compression of the PDCP SDU based on the ROHC profile of the source gNB, at step 713, performs integrity protection, and at step 714, performs ciphering using the security key and configuration of the source gNB. If the PDCP SDU is to be transmitted through the target gNB, source gNB, at step 709 forwards the PDCP SDU, the associated SN and the PDCP header after header compression (step 712) to the target gNB. Then the target gNB 720 at step 723, performs integrity protection, and at step 724, performs ciphering using the security key and configuration of the target gNB. Then the resulting PDCP Data PDU are submitted to lower layer. At steps 715 and 725, source 710 and target 720 adds PDCP header, respectively. At steps 716 and 726, source 710 and target 720 routes/duplicates the DL packets, including source DL 702 and target DL 703. When compressed packets each associated with one PDCP SDU, ciphering is performed via 718 and 728 for source and target, respectively. Based on predefined rules/configurations, some PDCP packets are ciphered before compression and some PDCP packets are not ciphered. In one embodiment, when compressed packets are standalone packets not associated with a PDCP SDU, such as interspersed ROHC feedback, ciphering is not performed via 719 and 729 for source target, respectively.

Figure 7B:
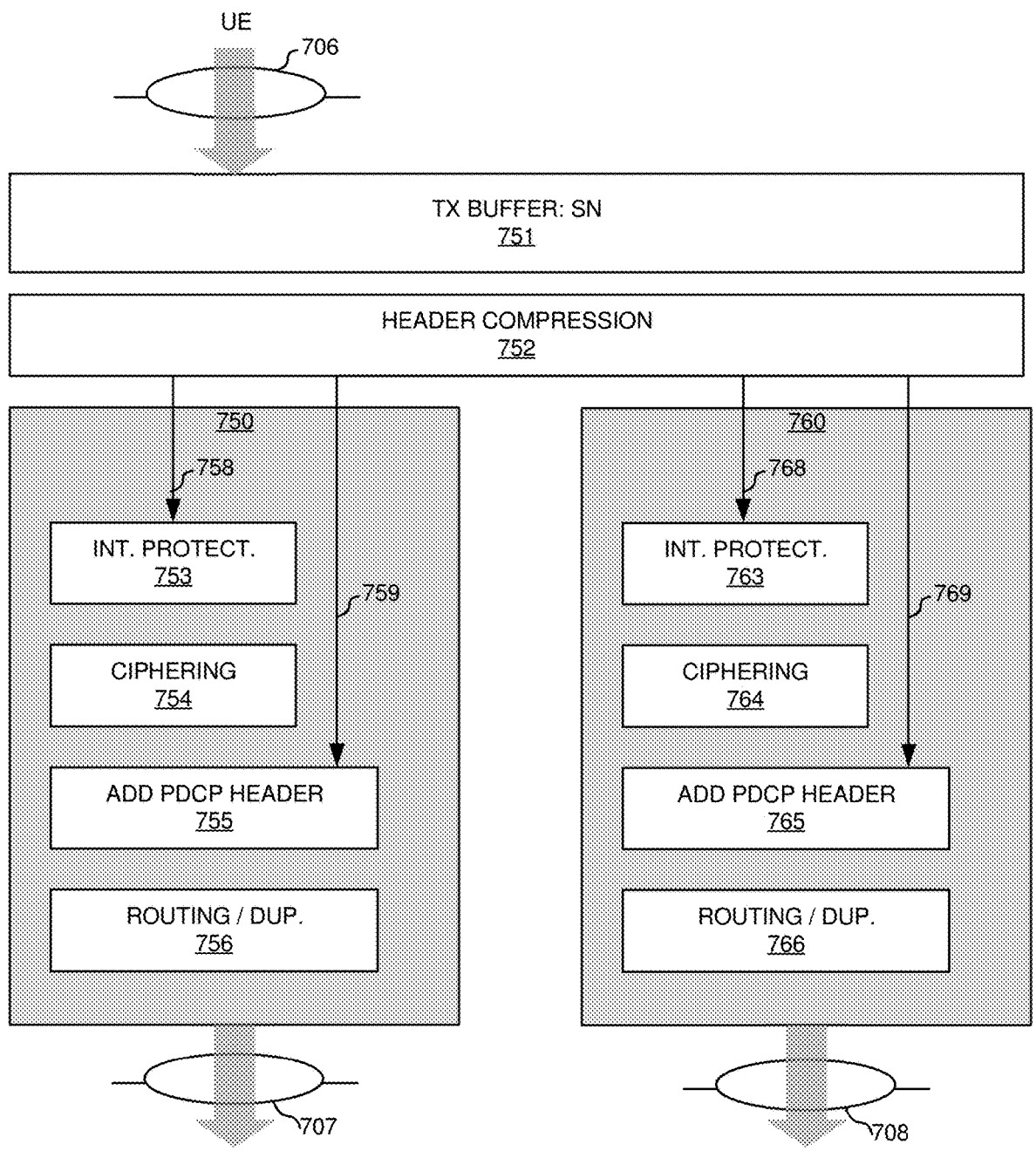
FIG. 7B illustrates an exemplary user-plane data transmission in PDCP layer with inter-gNB mobility with common header compression for UL in accordance with embodiments of the current invention.

FIG. 7B illustrates an exemplary user-plane data UL transmission in PDCP layer with inter-gNB mobility with common header compression for UL transmission in accordance with embodiments of the current invention. UL transmission 706 is handled by source 750 and target 760. In one embodiment of UL packets transmission, for a PDCP SDU received from upper layers, at step 751, the transmitting PDCP entity shall associate the COUNT value corresponding to TX_NEXT to this PDCP SDU, perform header compression of the PDCP SDU and set the PDCP SN of the PDCP Data PDU to TX_NEXT modulo $2^{[pdcp-SN-Size]}$. UE determine to which gNB to transmit the PDCP SDU. The PDCP SDU is transmitted to the base station from which UL grant is received. If the PDCP SDU is to be transmitted to the source gNB, source 750, at step 753, performs integrity protection, and at step 754, performs ciphering using the security key and configuration of the source gNB. If the PDCP SDU is to be transmitted to the target gNB, target 760, at step 763, performs integrity protection, and at step 764, performs ciphering using the security key and configuration of the target gNB. At steps 755 and 765, source 750 and target 760 adds the PDCP headers, respectively. At steps 756 and 766, source 750 and target 760 performs routing/duplication, and passes to target UL 707 and 708, respectively. Then the resulting PDCP Data PDU are submitted to lower layer associated to the target base station. When compressed packets each associated with one PDCP SDU, ciphering is performed via 758 and 768 for source and target, respectively. Based on predefined rules/configurations, some PDCP packets are ciphered before compression and some PDCP packets are not ciphered. In one embodiment, then compressed packets are standalone packets not associated with a PDCP SDU, such as interspersed ROHC feedback, ciphering is not performed via 759 and 769 for source target, respectively.

Figure 8A:
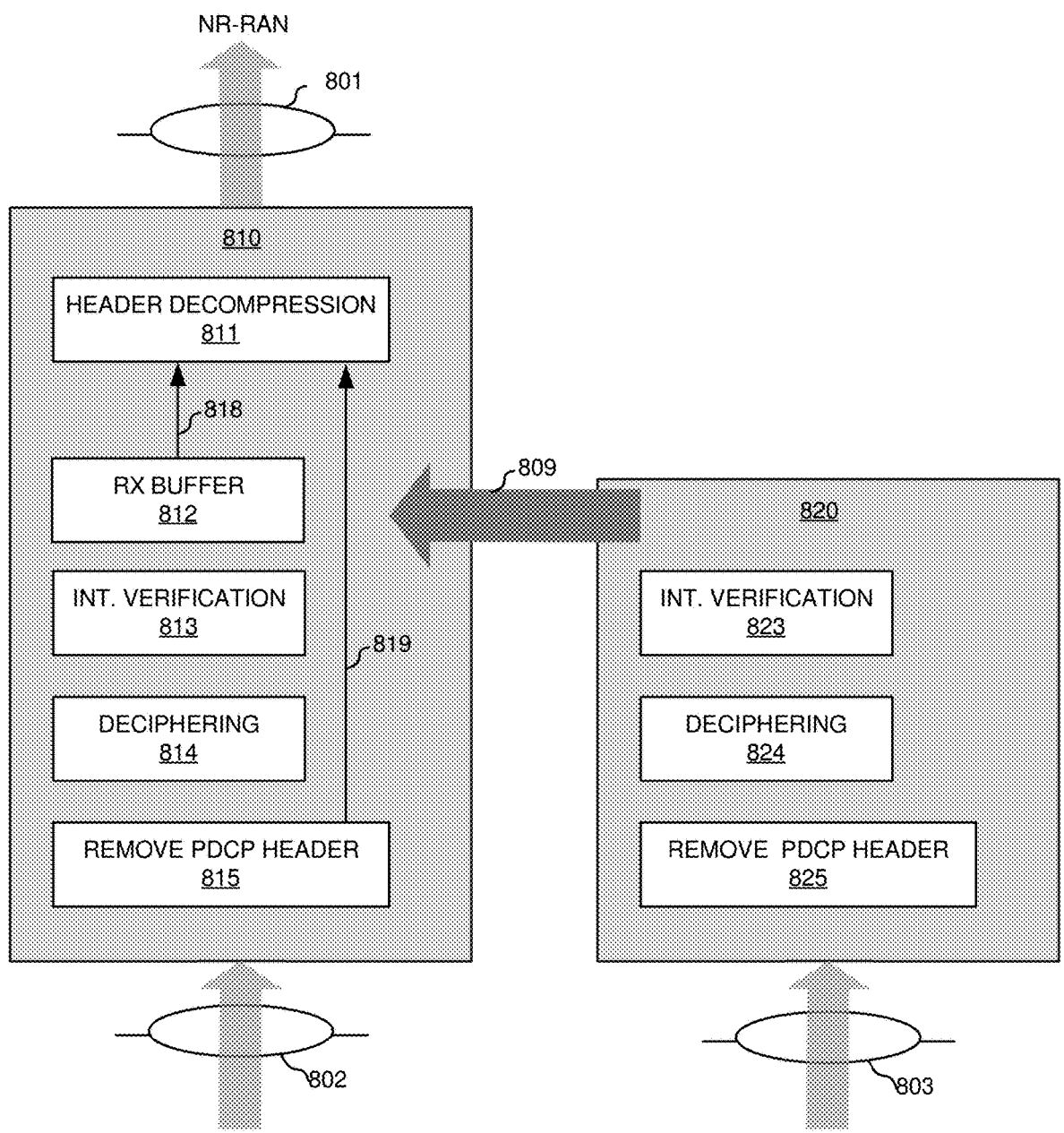
FIG. 8A illustrates an exemplary user-plane data reception in PDCP layer with inter-gNB mobility with one common header decompression in accordance with embodiments of the current invention.

FIG. 8A illustrates an exemplary user-plane data UL reception in PDCP layer with inter-gNB mobility with one common header decompression in accordance with embodiments of the current invention. UL reception 801 is handled by source 810 and target 820. In one embodiment of UL packets reception, both the source gNB and the target gNB have the receiving PDCP entity. At reception of a PDCP Data PDU from lower layers, each receiving PDCP entity shall determine the COUNT value of the received PDCP Data PDU, i.e. RCVD_COUNT. After determining the COUNT value of the received PDCP Data PDU=RCVD_COUNT, the receiving PDCP entity shall perform deciphering and integrity verification of the PDCP Data PDU using COUNT=RCVD_COUNT. If the receiving PDCP entity is associated to the source gNB, source entity 810, at step 815, removes PDCP header, at step 814, performs deciphering and at step 813 performs integrity verification with the security key and configuration of the source gNB. If the receiving PDCP entity is associated to the target gNB, target entity 820, at step 825 adds PDCP header, at step 824, performs deciphering and at step 823, performs integrity verification with the security key and configuration of the target gNB. Then the receiving PDCP entity of the target gNB, at step 809, forwards the PDCP SDUs, SN and headers to the source gNB. If the received PDCP Data PDU with COUNT value=RCVD_COUNT is not discarded before, the receiving PDCP entity of the source gNB shall store the resulting PDCP SDU in the reception buffer. Then, at step 812, the source 810 performs PDCP reordering for the PDCP SDUs stored in the reception buffer according to the COUNT value. The PDCP SDUs are delivered to upper layers in ascending order of the associated COUNT value after performing header decompression, if not decompressed before. At step 811, source 810 performs header decompression. Based on predefined rules/configurations, some PDCP packets are deciphered before decompression and some PDCP packets are not deciphered. In one embodiment, the PDCP data PDUs are deciphered before sending to decompression via 818 and 828 for source and target, respectively. The PDCP control PDUs, SDAP header and SDAP control PDU if included in the PDCP SDU are not deciphered via 819 and 829 for source and target, respectively.

Figure 8B:
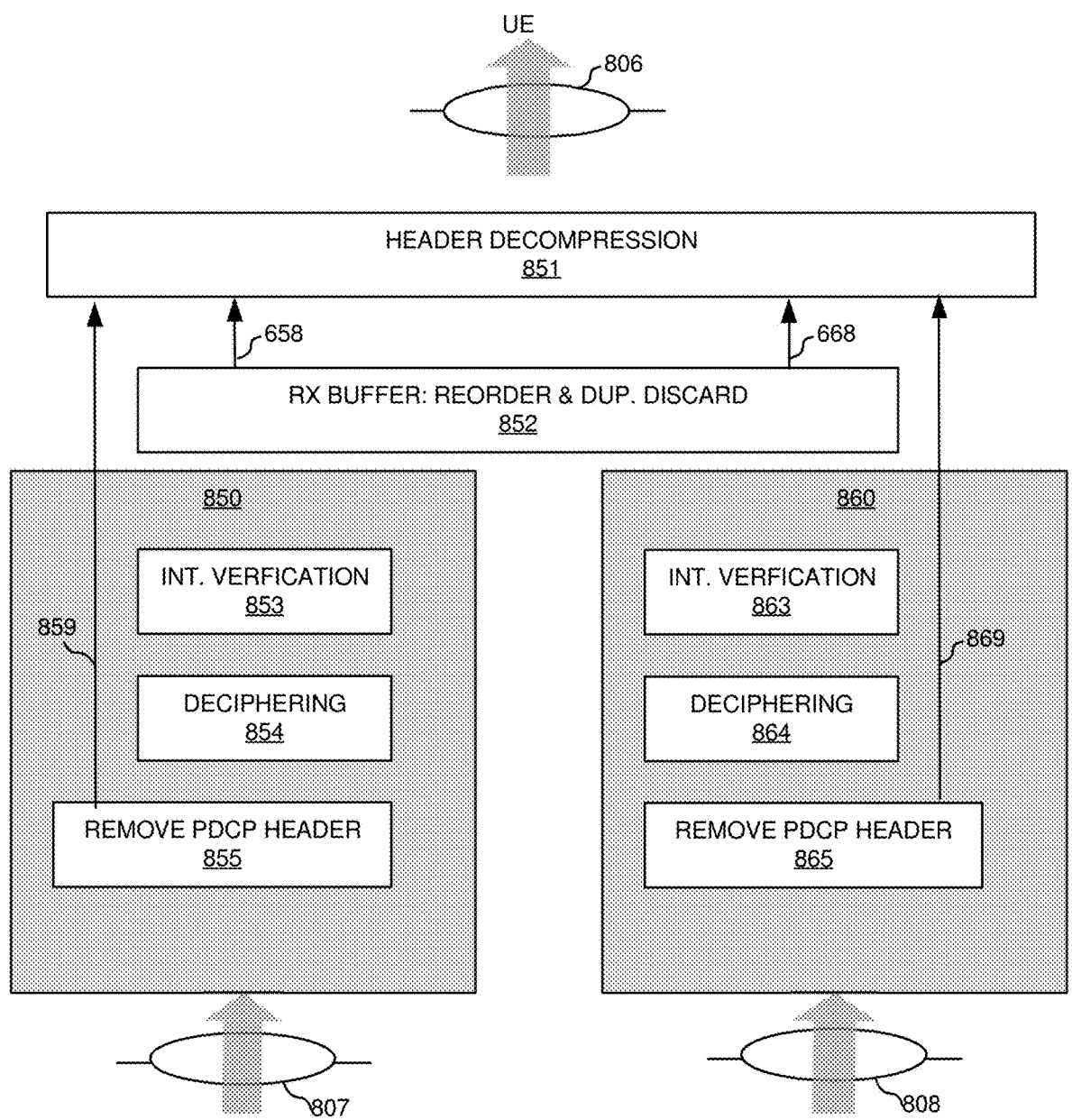
FIG. 8B illustrates an exemplary user-plane data reception in PDCP layer with inter-gNB mobility with one common header decompression and common buffer for DL in accordance with embodiments of the current invention.

FIG. 8B illustrates an exemplary user-plane data DL reception in PDCP layer with inter-gNB mobility with one common header decompression and common buffer for DL in accordance with embodiments of the current invention. DL transmission 805 is handled by source 850 and target 860. In one embodiment of DL packets reception, at reception of a PDCP Data PDU from lower layers, each receiving PDCP entity shall determine the COUNT value of the received PDCP Data PDU, i.e. RCVD_COUNT. After determining the COUNT value of the received PDCP Data PDU=RCVD_COUNT, the receiving PDCP entity shall perform deciphering and integrity verification of the PDCP Data PDU using COUNT=RCVD_COUNT. If the PDCP PDU is received from the source gNB, source 850 at step 855, removes PDCP header, at step 854, performs deciphering and at step 853, performs integrity verification with the security key and configuration of the source gNB. If the PDCP PDU is received from the target cell, target 860, at step 865, removes PDCP header, at step 864, performs deciphering and at step 863, performs integrity verification with the security key and configuration of the target cell. If the received PDCP Data PDU with COUNT value=RCVD_COUNT is not discarded before, at step 852, the receiving PDCP entity shall store the resulting PDCP SDU in the reception buffer. UE perform PDCP reordering for the PDCP SDUs stored in the reception buffer according to the COUNT value. The PDCP SDUs are delivered to upper layers in ascending order of the associated COUNT value after performing header decompression, if not decompressed before. At step 851, the UE performs header decompression for both source and target packets. The PDCP data PDUs are deciphered before sending to decompression via 858 and 868 for source and target, respectively. Based on predefined rules/configurations, some PDCP packets are deciphered before decompression and some PDCP packets are not deciphered. In one embodiment, the PDCP control PDUs, SDAP header and SDAP control PDU if included in the PDCP SDU are not deciphered via 859 and 869 for source and target, respectively.

Figure 9:
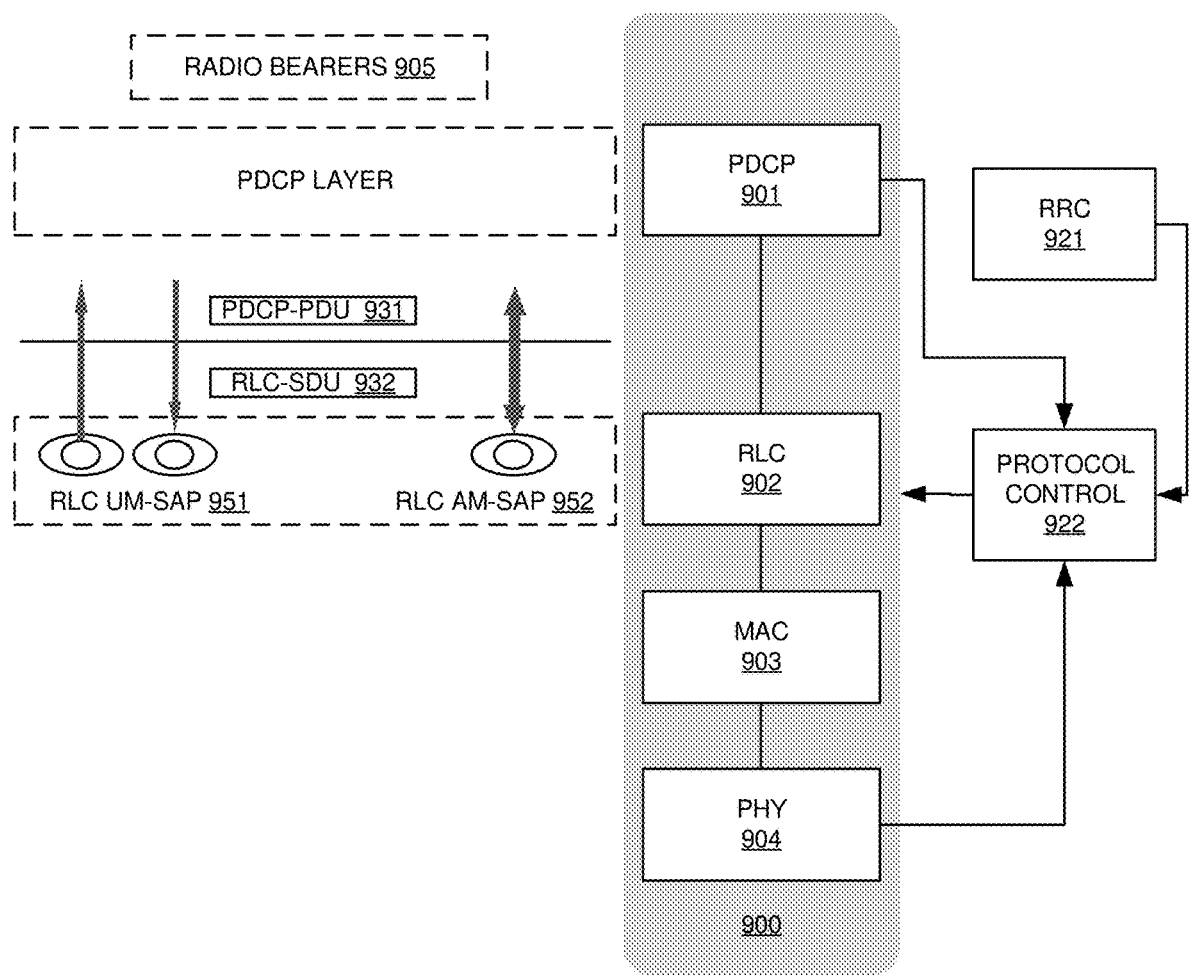
FIG. 9 illustrates exemplary diagrams of a source gNB protocol and control structure for PDCP functions and control procedures in accordance with embodiments of the current invention.

FIG. 9 illustrates exemplary diagrams of a source gNB protocol and control structure for PDCP functions and control procedures in accordance with embodiments of the current invention. Source protocol 900 includes PDCP 901, RLC 902, MAC 903 and PHY 904. Protocol control 922 communicates with PDCP 901 and the source stack 900. RRC 921 communicates with protocol control 922 for RRC signal related functions, such as release and reconfigure source stack. FIG. 9 also illustrates packet data flow. RLC unacknowledged mode (UM) service access point (SAP) 951 and RLC acknowledged mode (AM) SAP 952 move between RLC layer the PDCP layer via RCL channel. The RLC-SDU 932 passed to PDCP as PDCP-PDU 931 and vice versa. In some embodiments, the PDCP layer includes other functions such as header add/remove, integrity protection/verification and ciphering/deciphering. PDCP layer communicates with radio bearers 905.

In one embodiment, protocol controller 922 communicates with RRC 921 to release or reconfigure one protocol stack. In one embodiment, the UE releases a source or a target protocol stack by reconfiguring the PDCP layer and releases the corresponding source or target RLC, MAC and PHY layers. In one embodiment, the UE releases the protocol associated to the source gNB upon transmission of RRCReconfigurationComplete message. In one embodiment, UE release the protocol associated to the source gNB upon successfully reception of the RRCReconfigurationComplete message. In one embodiment, UE determines that the RRCReconfigurationComplete message is successfully received by the target gNB upon reception of RLC ACK. The RLC layer sends source protocol indication to the protocol controller upon reception of the RLC ACK for the RRCReconfigurationComplete message. In another embodiment, UE determines that the RRCReconfigurationComplete message is successfully received by the target gNB upon reception of HARQ ACK. The MAC layer sends source protocol indication to the protocol controller upon reception of the HARQ ACK for the RRCReconfigurationComplete message. In another embodiment, UE releases the protocol associated to the source gNB upon successfully reception of the first DL data packet of a DRB from the target gNB. In one embodiment, UE determines it receives a data packet of a DRB at PDCP layer, i.e. upon reception of a DL PDCP data PDU for a DRB. The PDCP layer sends source protocol indication to the protocol controller, which release the protocol for the source gNB. In one embodiment, the UE releases the protocol associated to the source gNB upon successfully reception of the first DL transport block from the target gNB in PDSCH channel. The MAC layer or the PHY layer sends source protocol indication to the protocol controller, which releases the protocol for the source gNB.

In one embodiment, the UE releases the protocol associated to the source gNB upon transmission of the first UL data packet of a DRB to the target gNB. In one embodiment, the UE determines it transmits a data packet of a DRB at PDCP layer, i.e. upon transmission of a UL PDCP data PDU for a DRB. The PDCP layer sends source protocol indication to the protocol controller, which releases the protocol for the source gNB. In one embodiment, the UE releases the protocol associated to the source gNB upon transmission of the first UL transport block to the target gNB in PUSCH channel. The MAC layer or the PHY layer sends source protocol indication to the protocol controller, which releases the protocol for the source gNB.

In one embodiment, the UE releases the protocol associated to the source gNB upon successfully transmission of the first UL data packet of a DRB to the target gNB. In one embodiment, the UE determines it transmits a data packet of a DRB at PDCP layer, i.e. upon transmission of a UL PDCP data PDU for a DRB. The UE determines that the PDCP data PDU is successfully received by the target gNB upon reception of RLC ACK or HARQ ACK from RLC layer or MAC/PHY layer. The RLC layer or MAC/PHY sends source protocol indication to the protocol controller, which releases the protocol for the source gNB. In one embodiment, the UE releases the protocol associated to the source gNB upon successfully transmission of the first UL transport block to the target gNB in PUSCH channel. The UE determines the TB is successfully received by the target gNB upon reception of HARQ ACK. The MAC layer or the PHY layer sends source protocol indication to the protocol controller, which release the protocol for the source gNB. In another embodiment, the UE releases the protocol associated to the source gNB upon delivery of the first DL PDCP SDU of a DRB received from the target gNB to SDAP layer.

Figure 10:
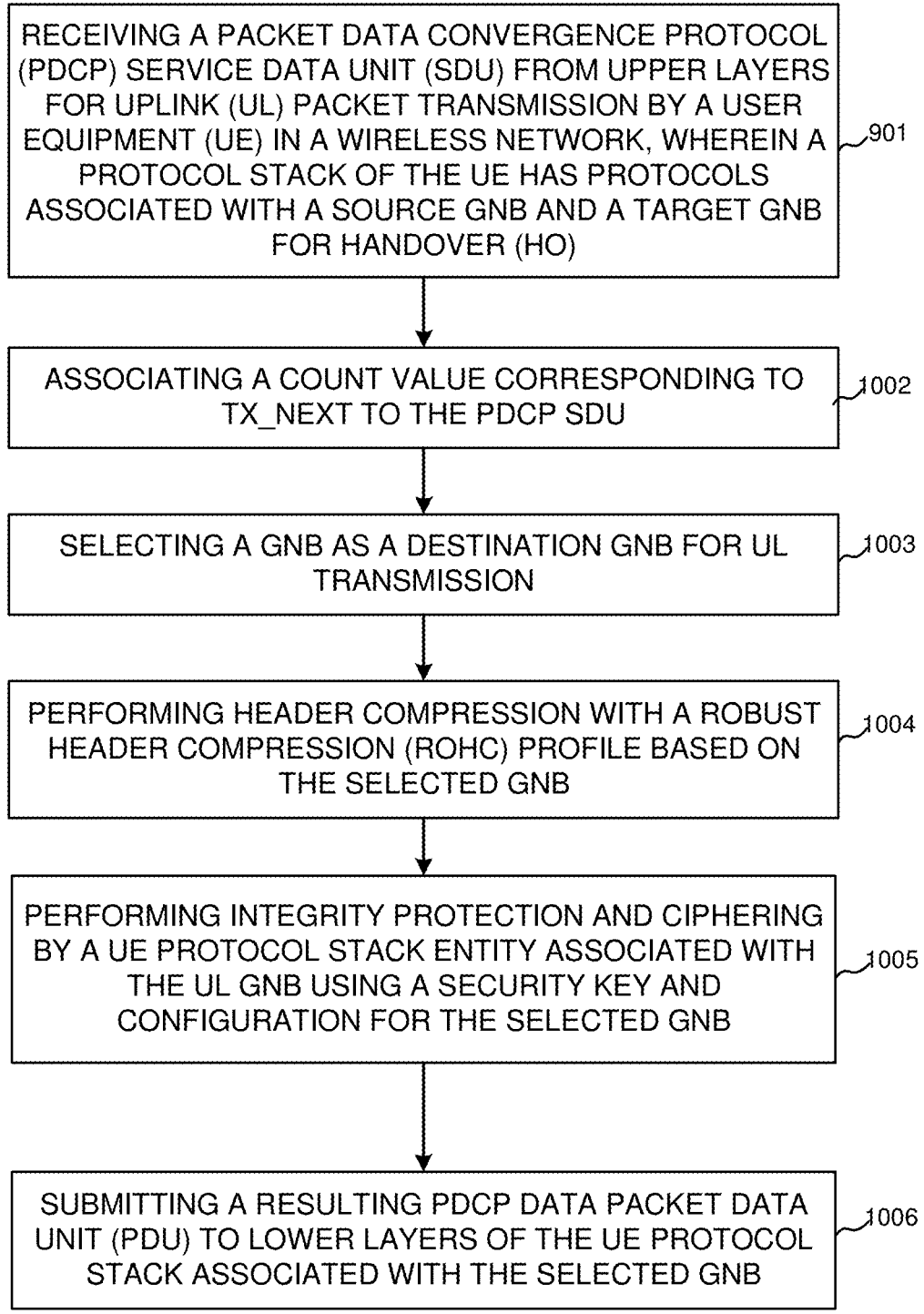
FIG. 10 illustrates an exemplary flow chart for UL mobility enhancement with dual protocol in accordance with embodiments of the current invention.

FIG. 10 illustrates an exemplary flow chart for UL mobility enhancement with dual protocol in accordance with embodiments of the current invention. At step 1001, the UE receives a packet data convergence protocol (PDCP) service data unit (SDU) from upper layers for uplink (UL) packet transmission in a wireless network, wherein a protocol stack of the UE has protocols associated with a source gNB and a target gNB for handover. At step 1002, the UE associates a COUNT value corresponding to TX_NEXT to the PDCP SDU. At step 1003, the UE selects an gNB as a destination gNB for UL transmission. At step 1004, the UE performs header compression with a robust header compression (ROHC) profile based on the selected gNB. At step 1005, the UE performs integrity protection and ciphering by a UE protocol stack entity associated with the selected gNB using a security key and configuration for the selected gNB. At step 1006, the UE submits a resulting PDCP data packet data unit (PDU) to lower layers of the UE protocol stack associated with the selected gNB.

Figure 11:
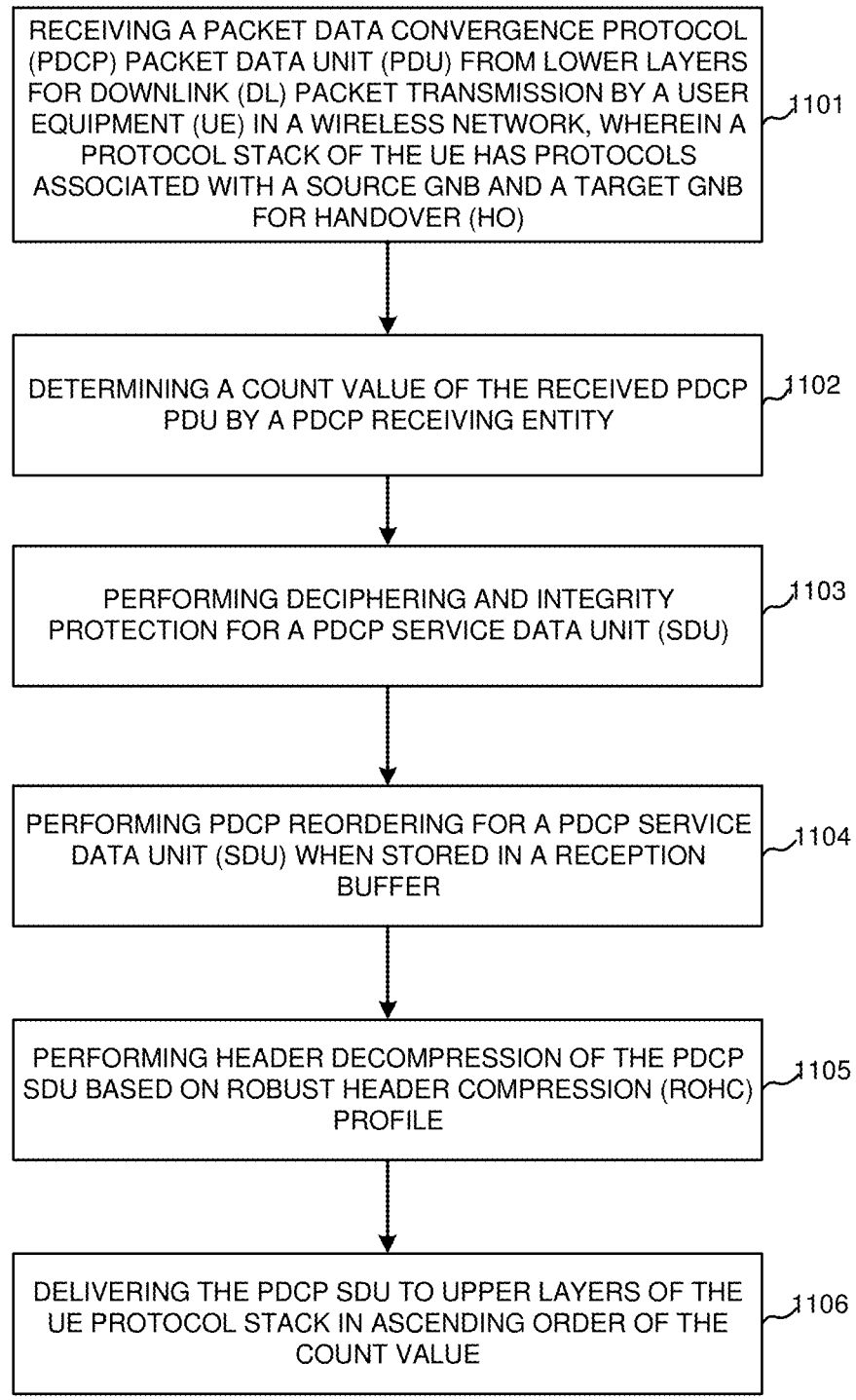
FIG. 11 illustrates an exemplary flow chart for DL mobility enhancement with dual protocol in accordance with embodiments of the current invention.

FIG. 11 illustrates an exemplary flow chart for DL mobility enhancement with dual protocol in accordance with embodiments of the current invention. At step 1101, the UE receives a packet data convergence protocol (PDCP) packet data unit (PDU) from lower layers for downlink (DL) packet transmission in a wireless network, wherein a protocol stack of the UE has protocols associated with a source gNB and a target gNB for handover (HO). At step 1102, the UE determines a COUNT value of the received PDCP PDU by a PDCP receiving entity associated with a gNB from which the PDCP PDU is received. At step 1103, the UE performs deciphering and integrity verification with the security key and configuration of gNB from which the PDCP PDU is received. At step 1104, the UE performs PDCP reordering for a PDCP service data unit (SDU) when stored in a reception buffer. At step 1105, the UE performs header decompression of the PDCP SDU based on robust header compression (ROHC) profile of the gNB from which the PDCP PDU is received. At step 1106, the UE delivers the PDCP SDU to upper layers of the UE protocol stack in ascending order of the COUNT value.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   receiving a packet data convergence protocol (PDCP) service data unit (SDU) from upper layers for uplink (UL) packet transmission by a user equipment (UE) in a wireless network, wherein a protocol stack of the UE has a dual protocol stack including a source protocol stack protocols associated with a source gNB and a target protocol stack associated with a target gNB for handover (HO), wherein the UE uses the source protocol stack or the target protocol stack based on where an UL grant is received for UL packet transmission;
   associating a COUNT value corresponding to TX_NEXT to the PDCP SDU;
   selecting an gNB as a destination gNB for UL transmission, wherein the destination gNB is the source gNB or the target gNB;
   performing header compression with a robust header compression (ROHC) profile based on the selected destination gNB, wherein the UE maintains ROHC profiles for the source gNB and the target gNB and applies one ROHC profile based on the PDCP SDU;
   performing integrity protection and ciphering by a UE the source protocol stack or the target protocol stack associated with the selected destination gNB using a security key and configuration for the selected destination gNB; and
   submitting a resulting PDCP data packet data unit (PDU) to lower layers of the UE dual protocol stack associated with the selected destination gNB.

2. The method of claim 1, wherein the UE selects the destination gNB when an UL grant is received from the selected gNB.

3. The method of claim 1, wherein corresponding ROHC profiles are configured for the source gNB and the target gNB by the wireless network.

4. The method of claim 3, wherein the ROHC profile for the selected gNB is configured by the destination gNB itself.

5. The method of claim 1, further comprising:
   reconfiguring PDCP of the dual protocol stack; and releasing RLC, MAC, and PHY layers of the dual protocol stack associated with the source gNB upon transmitting a Reconfiguration Complete message to the target gNB.

6. A method for a user equipment (UE), comprising:
   receiving, by the UE, a packet data convergence protocol (PDCP) packet data unit (PDU) from lower layers of a receiving protocol stack for downlink (DL) packet in a wireless network, wherein the receiving protocol stack of the UE is a dual protocol stack including a source protocol stack associated with a source gNB and a target protocol stack associated with a target gNB for handover (HO), wherein the receiving protocol stack receives PDCP PDU from the source gNB through the source protocol stack and receives PDCP PDU from the target gNB through the target protocol stack;
   determining a COUNT value of the received PDCP PDU by a PDCP receiving entity;
   performing deciphering and integrity protection by the receiving protocol stack for a PDCP service data unit (SDU);
   performing PDCP reordering for a PDCP service data unit (SDU) when stored in a reception buffer;

performing header decompression of the PDCP SDU based on robust header compression (ROHC) profile, wherein the UE maintains ROHC profiles for the source qNB and the target gNB and applies one ROHC profile based on the PDCP SDU; and delivering the PDCP SDU to upper layers of the UE protocol stack in ascending order of the COUNT value.

7. The method of claim 6, wherein corresponding ROHC profiles are configured for the source gNB and the target gNB by the wireless network.

8. The method of claim 7, wherein gNB ROHC profiles are configured by corresponding source gNB and target gNB respectively.

9. The method of claim 6, wherein PDCP reordering is performed after header decompression.

10. The method of claim 6, wherein PDCP reordering is performed before header decompression.

11. The method of claim 10, further comprising routing the PDCP SDU after PDCP reordering to a corresponding header decompression entity associated to the gNB from which the PDCP PDU is received.

12. The method of claim 6, further comprising: reconfiguring PDCP of the dual protocol stack; and releasing RLC, MAC, and PHY layers of the dual protocol stack associated with the source gNB upon transmitting a Reconfiguration Complete message to the target gNB.

13. The method of claim 6, wherein the deciphering and integrity verification is performed with the security key and configuration of the gNB from which the PDCP PDU is received.

14. The method of claim 6, wherein the header decompression is performed with the ROHC profile of the gNB form which the PDCP PDU is received.

15. A user equipment (UE), comprising:
a transceiver that transmits and receives radio frequency (RF) signal in a wireless network;
an uplink (UL) unit that receives a packet data convergence protocol (PDCP) service data unit (SDU) from upper layers for uplink (UL) packet transmission, wherein a protocol stack of the UE has a dual protocol stack including a source protocol stack protocols associated with a source gNB and a target protocol stack associated with a target gNB for handover (HO) and associates a COUNT value corresponding to TX_NEXT to the PDCP SDU), and wherein the UE uses the source protocol stack or the target protocol stack based on where an UL grant is received for UL packet transmission;

an UL selector that selects an UL gNB as a destination gNB for UL transmission, wherein the destination gNB is the source gNB or the target gNB; and an UL controller that performs header compression with a robust header compression (ROHC) profile based on the UL gNB, performs integrity protection and ciphering by the source protocol stack or the target protocol stack associated with the destination gNB using a security key and configuration for the destination gNB, wherein the UE maintains ROHC profiles for the source qNB and the target qNB and applies one ROHC profile based on the PDCP SDU, and submits a resulting PDCP data packet data unit (PDU) to lower layers of the dual protocol stack associated with the destination gNB.

16. The UE of claim 15, wherein the UE selects the destination gNB when an UL grant is received from the selected gNB.

17. The UE of claim 15, wherein corresponding ROHC profiles are configured for the source gNB and the target gNB by the wireless network.

18. The UE of claim 17, wherein the ROHC profile for the-destination gNB is configured by the selected UL gNB.

19. The UE of claim 15, further comprising a downlink (DL) unit that receives a PDCP PDU from lower layers for DL packet transmission, determines a COUNT value of the received PDCP PDU by a PDCP receiving entity associated with a gNB from which the PDCP PDU is received;

performs PDCP reordering for a PDCP service data unit (SDU) when stored in a reception buffer; performs header decompression of the PDCP SDU based on ROHC profile; and delivers the PDCP SDU to upper layers of the dual protocol stack in ascending order of the COUNT value.

20. The UE of claim 19, wherein PDCP reordering is performed after header decompression.

21. The UE of claim 19, wherein PDCP reordering is performed before header decompression, and the DL unit routes the PDCP SDU after PDCP reordering to a corresponding header decompression entity associated to the gNB from which the PDCP PDU is received.

22. The UE of claim 15, further comprising a release unit that reconfigures PDCP of the dual protocol stack; and releases RLC, MAC, and PHY layers of the dual protocol stack associated with the source gNB upon transmitting a Reconfiguration Complete message to the target gNB.

\* \* \* \* \*